United States Patent
Isenhour et al.

(10) Patent No.: US 7,330,624 B2
(45) Date of Patent: Feb. 12, 2008

(54) LOOPBACK DEVICE UTILIZING BEND INSENSITIVE OPTICAL FIBER

(75) Inventors: Micah C. Isenhour, Lincolnton, NC (US); Christopher P. Lewallen, Hudson, NC (US); James P. Luther, Hickory, NC (US); Thomas Theuerkorn, Hickory, NC (US); Hieu V. Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/406,190

(22) Filed: Apr. 18, 2006

(65) Prior Publication Data

US 2007/0274658 A1    Nov. 29, 2007

(51) Int. Cl.
*G02B 6/00*    (2006.01)

(52) U.S. Cl. .................. 385/134; 385/135; 385/136; 385/137

(58) Field of Classification Search ......... 385/134–137
See application file for complete search history.

(56) References Cited

U.S. PATENT DOCUMENTS

| | | | |
|---|---|---|---|
| 4,979,793 A * | 12/1990 | Bowen et al. | 385/140 |
| 5,367,159 A | 11/1994 | Schofield et al. | 250/227.11 |
| 6,122,420 A | 9/2000 | Satoh | 385/33 |
| 6,439,776 B1 * | 8/2002 | Harrison et al. | 385/53 |
| 6,454,464 B1 | 9/2002 | Nolan | 385/60 |
| 6,707,979 B2 | 3/2004 | Wang et al. | 385/140 |

\* cited by examiner

*Primary Examiner*—Jennifer Doan
(74) *Attorney, Agent, or Firm*—Keith A. Roberson

(57) ABSTRACT

A loopback device utilizing bend insensitive optical fiber to facilitate deployment of a connectorized fiber optic distribution cable through small-diameter conduit. A loopback device utilizing bend insensitive optical fiber for use within an optical network to route optical signals transmitted downstream along one or more optical fibers back upstream along the same or other optical fibers for the purpose of the determining the integrity of the downstream and upstream optical paths from a single upstream location. A loopback device including one or more bend insensitive optical fibers, a multi-fiber loopback ferrule and a dust cap for sealing engaging a connector plug attached to a distribution cable or a tether of a pre-engineered distribution cable assembly prior to installation of the distribution cable.

8 Claims, 13 Drawing Sheets

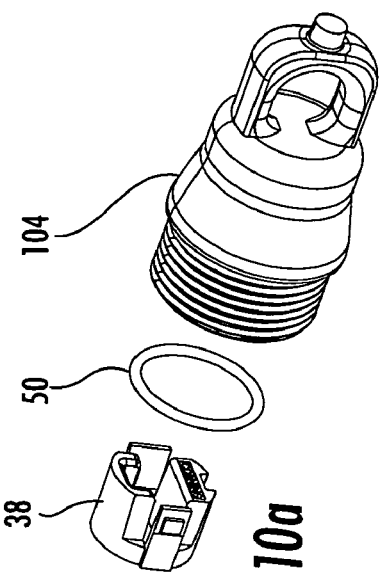
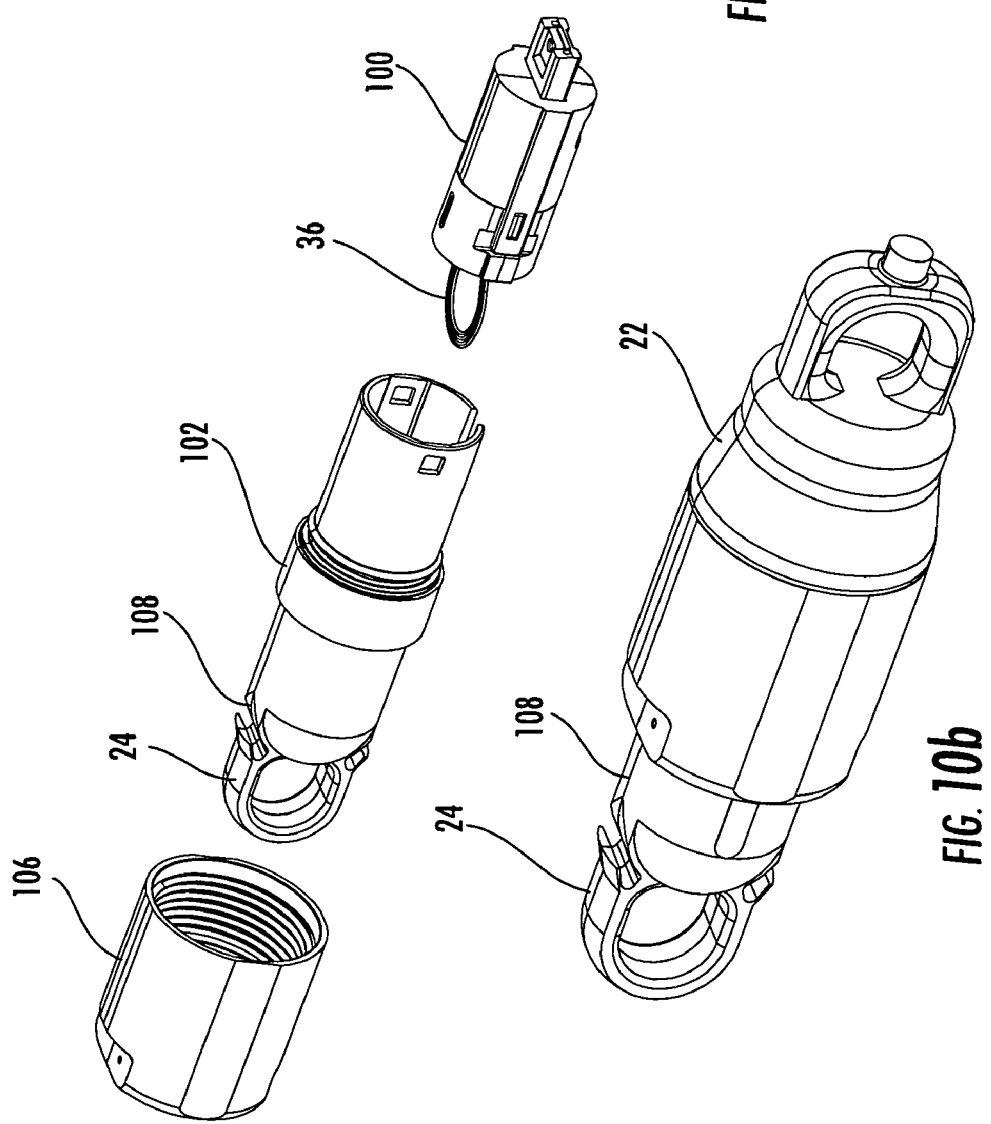

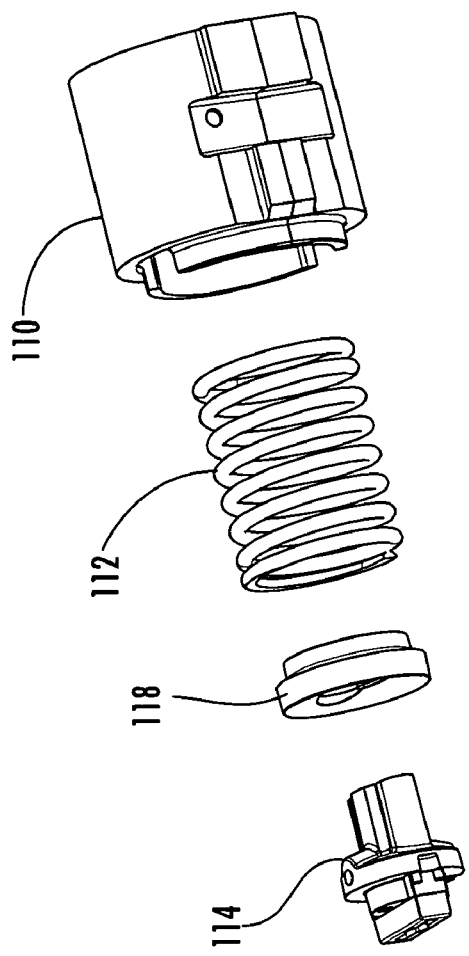
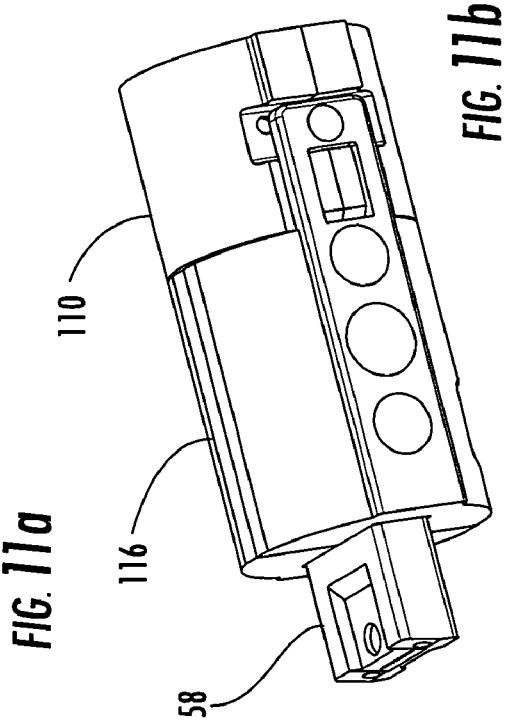
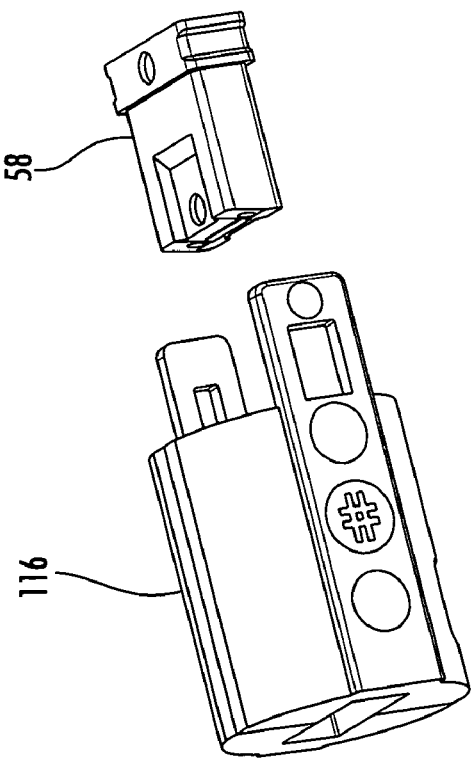
FIG. 11a
FIG. 11b

LOOPBACK DEVICE UTILIZING BEND INSENSITIVE OPTICAL FIBER

BACKGROUND OF THE INVENTION

1. Field of the Invention

The present invention relates generally to a loopback device for use in a Fiber-to-the-Premises (FTTP) optical network, and more specifically, to a loopback device utilizing bend insensitive optical fiber to facilitate deployment of a connectorized distribution cable through a small-diameter conduit.

2. Technical Background

Optical fiber is increasingly being used to deliver voice, video and data transmissions. In this regard, fiber optic networks have been developed to deliver Fiber-to-the-Premises (FTTP), Fiber-to-the-Curb (FTTC) and Fiber-to-the-Subscriber (FTTS), collectively referred to as "FTTx networks." The most recently developed of these FTTx networks typically include distributions cables that originate from a central office and extend outwardly along a main route in aerial and/or buried installations. At various locations along the length of these distribution cables, optical fibers are severed (pre-terminated) from the distribution cable and routed separately away from the distribution cable to provide branches off of the distribution cable, referred to herein as "tap points," "mid-span access locations," "branch points" or "tether attach points." At these tap points, pre-terminated optical fibers of the distribution cable are often spliced or otherwise optically connected to a length of optical cable referred to herein as a "tether." The tether is used to provide optical fiber to an optical network terminal (ONT), network interface device (NID) or other optical connection terminal located along the distribution cable within reach of the tether. Tethers may also be used for mitigating span length measurement issues resulting from errors in pre-engineered cable assembly installations.

At the downstream end of each tether, one or more optical fibers optically connected to the optical fibers of the distribution cable are typically terminated to a multi-fiber ferrule. As the branched optical fibers are needed for service, the multi-fiber ferrule end of the tether is routed to a predetermined location and optically connected to the ONT, NID or other optical connection terminal in a known manner. Tether cable ferrules that have not yet been connected into service are typically protected and environmentally sealed using a dust cap that keeps the ferrule free of contaminants and protected from physical damage.

In the past, in order to test the optical continuity of optical fibers originating at a central office that pass through a tap point and terminate at a multi-fiber ferrule, it was necessary for a field technician and/or optical signal detection equipment to be physically present at the end of the tether in order to measure signal strength or loss through the total length of optical fiber. This time consuming procedure results in increased deployment costs in FTTx networks. Further, by having to measure signal strength and loss at the physical downstream location, it is often necessary to remove the dust cap in order to provide access to the ferrule, thus exposing the ferrule to contaminants and potential physical damage.

Accordingly, what is needed is a device that makes it possible to measure signal strength or loss along a length of optical fiber, including along a length of spliced together segments of optical fibers, without the need for a field technician and/or optical signal detection equipment to be physically present at the downstream end of the fiber. Further, what is needed is a device that enables a service provider to measure signal strength or loss in a length of optical fiber from the upstream end of the fiber at which an optical signal originates. Still further, what is needed is a device adapted to be deployed along with a pre-engineered fiber optic distribution cable that allows for signal strength or loss to be determined at the upstream end of a length of interconnected optical fibers while providing protection for a connectorized downstream end during installation, and until the connectorized end is needed to provide service. Such a device is preferably provided for each multi-fiber connector within an FTTx network. A desired device would include bend insensitive optical fiber to facilitate deployment of a connectorized distribution cable through a small-diameter conduit, such as a cable conduit having an inner diameter as small as about 1.25 inches.

SUMMARY OF THE INVENTION

In one aspect, the present invention is directed to a loopback device utilizing bend insensitive optical fiber that allows an optical signal to be detected along an extended length of optical fibers from the signal origination location, without the need for a field technician and/or optical signal detection equipment to be physically present at the downstream end of the fibers. In one embodiment, the loopback device includes one or more short lengths of bend insensitive optical fibers that optically interconnect a first optical fiber terminated to a multi-fiber ferrule with a second optical fiber terminated to the same multi-fiber ferrule, so that an optical signal transmitted from an upstream location through the first optical fiber is transmitted through the loopback and back upstream through the second length of optical fiber to the same upstream location. For example, in a 12-fiber ferrule, the loopback device may be used to optically connect fiber-1 to fiber-12, fiber-2 to fiber-11, fiber-3 to fiber-10, etc., thereby making fibers 1 and 12 continuous, for example, in order to detect an optical signal transmitted downstream through fiber-1 at the upstream end of fiber-12. Thus, the loopback device provides a "loop" of fibers for returning an optical signal transmitted downstream through one or more optical fibers back upstream through the same or other optical fibers. The loopback device may be designed to accommodate 2f, 4f, 6f, 8f, 12f, 24f, 32f, 48f and 72f multi-fiber ferrules, among others. The loopback device of the present invention avoids the high losses associated with conventional SMF 28-type optical fiber. The loopback device is preferably capable of maintaining bend related losses below about 0.5 dB at about 1300 nm wavelength for about a 12.0 mm bend through about 180 degrees.

In another aspect, the present invention is directed to a loopback device that is compact in size and includes bend insensitive optical fiber to facilitate deployment through about a 1.25 inch diameter conduit. The loopback device includes an inner assembly having a loopback body defining a spool about a first end of the body and ferrule receiving features about the second end of the body. A fiber transition ferrule is provided at the second end and is adapted to be received within a multi-fiber ferrule of a type corresponding to the multi-fiber ferrule of the tap point or tether on which the loopback is attached. The loopback further includes a sleeve insert and an outer sleeve having predetermined orientation geometry and an O-ring channel. One or more bend insensitive optical fibers, bend optimized optical fibers, photonic band gap optical fibers, or reduced minimum bend radius optical fibers, all of which are referred to generically herein as bend insensitive fiber (BIF) or bend insensitive fibers (BIFs), are routed around the spool portion of the loopback body and terminated at each end to a common multi-fiber ferrule. The ferrule of the loopback device corresponds to the ferrule of the connectorized tap point or tether on which the loopback is attached. The inner assembly is protected and sealed from the environment by a protective dust cap that includes an optional pulling grip. The dust cap sealingly engages a plug end provided on the connectorized tether cable or tap point.

In yet another aspect, the present invention is directed to loopback assembly including a loopback subassembly, a loopback outer housing, a plug sleeve insert for a multi-fiber connector (e.g., an MT style connector available from Corning Cable Systems LLC of Hickory, N.C.), a plug dust cap and a plug coupling nut. The subassembly includes a multi-fiber ferrule, a spring centering cuff, a plug inner housing, a ferrule boot, a spring and a loopback spring push. The loopback assembly may be connected to a distribution cable assembly prior to installation and is capable of being deployed through small-diameter conduit, such as a cable conduit having an inner diameter as small as about 1.25 inches. The loopback assembly may include a spring that exerts a reduced spring load on the loopback ferrule as compared to the connectorized distribution cable ferrule in order to avoid moisture induced degradation of the fiber array of the distribution cable ferrule. In an alternative embodiment, the loopback device may include a low-strength adhesive, such as a two-part RTV, in order to prevent degradation of the fiber array of the distribution cable ferrule during long-term mating. In another alternative embodiment, fiber array degradation due to moisture absorption may be avoided using a desiccant pill.

In yet another aspect, the present invention is directed to a pre-engineered fiber optic distribution cable assembly including one or more tap points at predetermined locations along the length of the distribution cable. At each tap point, a plurality of optical fibers are severed, branched and routed away from the remaining optical fibers of the distribution cable. The branched (pre-terminated) optical fibers may be spliced or otherwise optically connected to optical fibers of a tether cable. The tether cable preferably terminates in a plug connector including a multi-fiber ferrule available for connection after the initial cable assembly installation with a multi-fiber ferrule of a receptacle connector provided on an ONT, ND or other optical connection terminal. A loopback device including bend insensitive fiber is connected to each plug of the assembly. Each loopback device is protected by a dust cap defining an optional pulling grip. The loopback device and dust cap remain connected to the plug until the plug is placed into service. The loopback device provides a means for routing optical signals transmitted downstream along an optical fiber through the loopback device and back upstream through the same or another optical fiber. The loopback device may be used to determine the integrity of an optical path following distribution cable installation without a field technician or detecting equipment being physically present at the downstream plug connector. Bend insensitive fibers allow for a compact package, making the loopback device capable of being installed along with the distribution cable assembly through a small-diameter conduit.

Additional features and advantages of the invention will be set forth in the detailed description which follows, and in part will be readily apparent to those skilled in the art from that description or recognized by practicing the invention as described herein, including the following detailed description, the claims, and the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

BRIEF DESCRIPTION OF THE DRAWINGS

FIG. 10a is an exploded perspective view of another embodiment of a loopback device according to the invention;

FIG. 10b is a perspective view of the loopback device of FIG. 10a shown fully assembled;

FIG. 11a is an exploded perspective view of the loopback subassembly of the loopback device of FIG. 10a; and FIG. 11b is a perspective view of the loopback subassembly of FIG. 11a shown fully assembled.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numbers will be used throughout the drawings to refer to the same or like parts. Although alternative embodiments of loopback devices are shown and described throughout the detailed description as being used in conjunction with a tether or tap point of a connectorized fiber optic distribution cable assembly, it is envisioned that the loopback devices of the present invention may be used in any fiber optic network in which is it desired to loop an optical signal. Further, the loopback devices of the present invention may include any type of bend insensitive fiber that allows for a compact cable assembly capable of being installed through a small diameter conduit or duct, such as a cable conduit having an inner diameter as small as about 1.25 inches.

Figure 1:
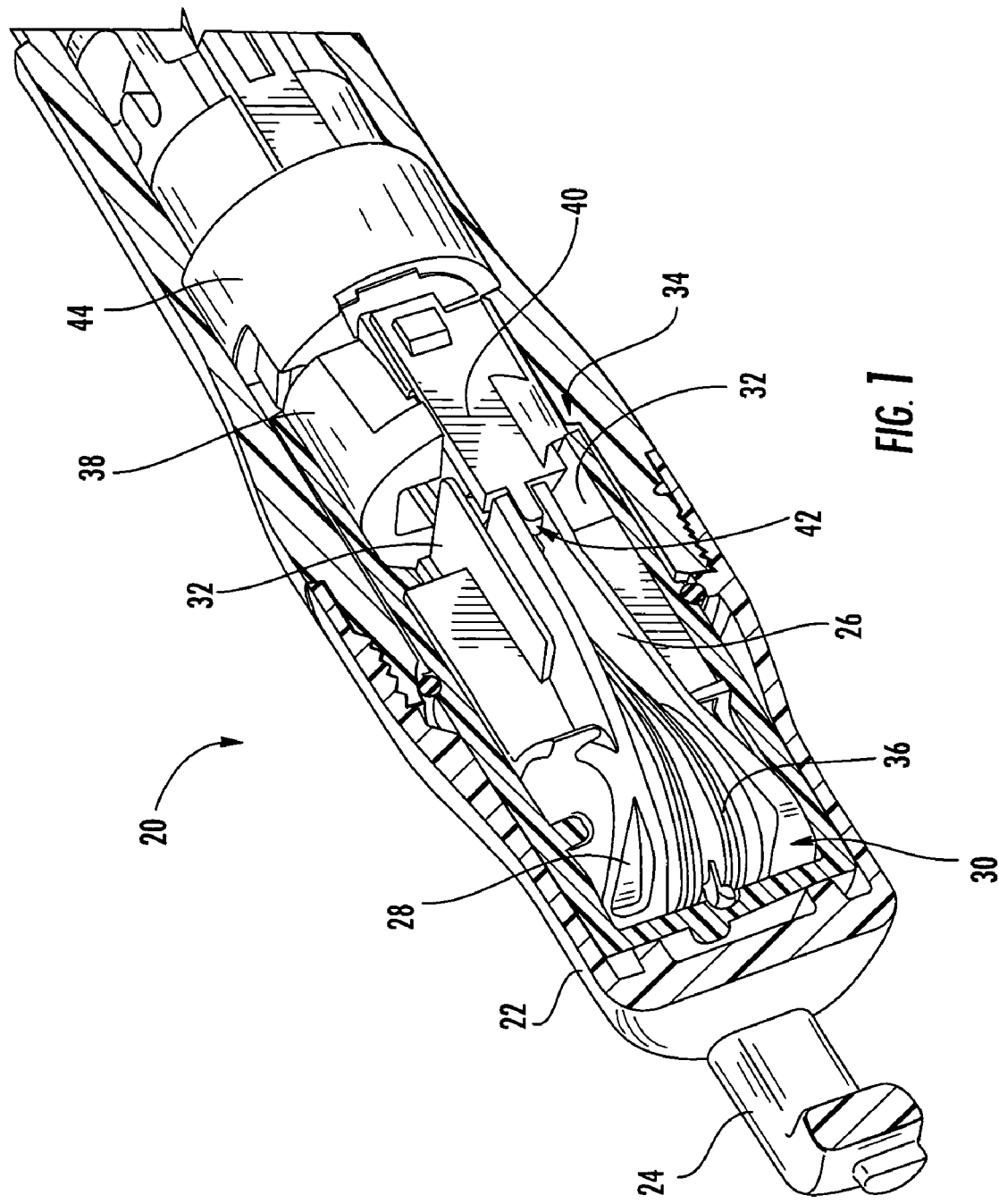
FIG. 1 is a perspective view of one embodiment of a loopback device according to the invention shown connected to a plug connector and with a portion of the dust cap and the outer sleeve removed for purposes of clarity.

Referring to FIG. 1, a loopback device 20 including bend insensitive fiber in accordance with one embodiment of the present invention is shown with a portion of the dust cap and the outer sleeve removed to illustrate the internal structure of the device. The loopback 20 includes an inner assembly of components that are sealingly enclosed within a protective dust cap 22 defining an optional pulling grip 24. The inner assembly includes a loopback body 26 defining a spool 28 about a first end 30 of the body 26 and ferrule retaining features 32 about the second end 34 of the body 26. One or more bend insensitive optical fibers, bend optimized optical fibers, photonic band gap fibers, or reduced minimum bend radius fibers, or any other optical fiber having improved bend performance for space limited applications, collectively referred to herein as bend insensitive fiber (BIF) or bend insensitive fibers (BIFs) 36, are routed around the spool 28 of the loopback body 26. Throughout this written description, the term "bend insensitive fiber" or "BIF" is intended to generically describe improved bend performance fibers. Both ends of the one or more fibers 36 are routed through a fiber transition ferrule (not shown) and terminated to a common multi-fiber ferrule (not shown). The spool 28 defines a fiber routing channel along its outer surface for maintaining the one or more bend insensitive fibers 36. The spool preferably has a radius sufficient so as to not violate the minimum bend radius of the optical fibers 36, and is preferably small enough to provide a compact loopback device capable of being pulled through about a 1.25 inch diameter conduit along with the distribution cable and tether, if present. The spool 28 may further define a cavity for receiving a desiccant pill for absorbing moisture that may accumulate at the loopback device. An alignment sleeve insert 38 retains the ferrule within the loopback body 26 and defines orientation geometry features 40 that are received within slots 42 defined by the loopback body 26. The loopback body 26 and sleeve insert 38 are preferably molded from plastic. The loopback device 20 is shown connected to a plug connector 44 including a multi-fiber connector of like type.

Figure 2:
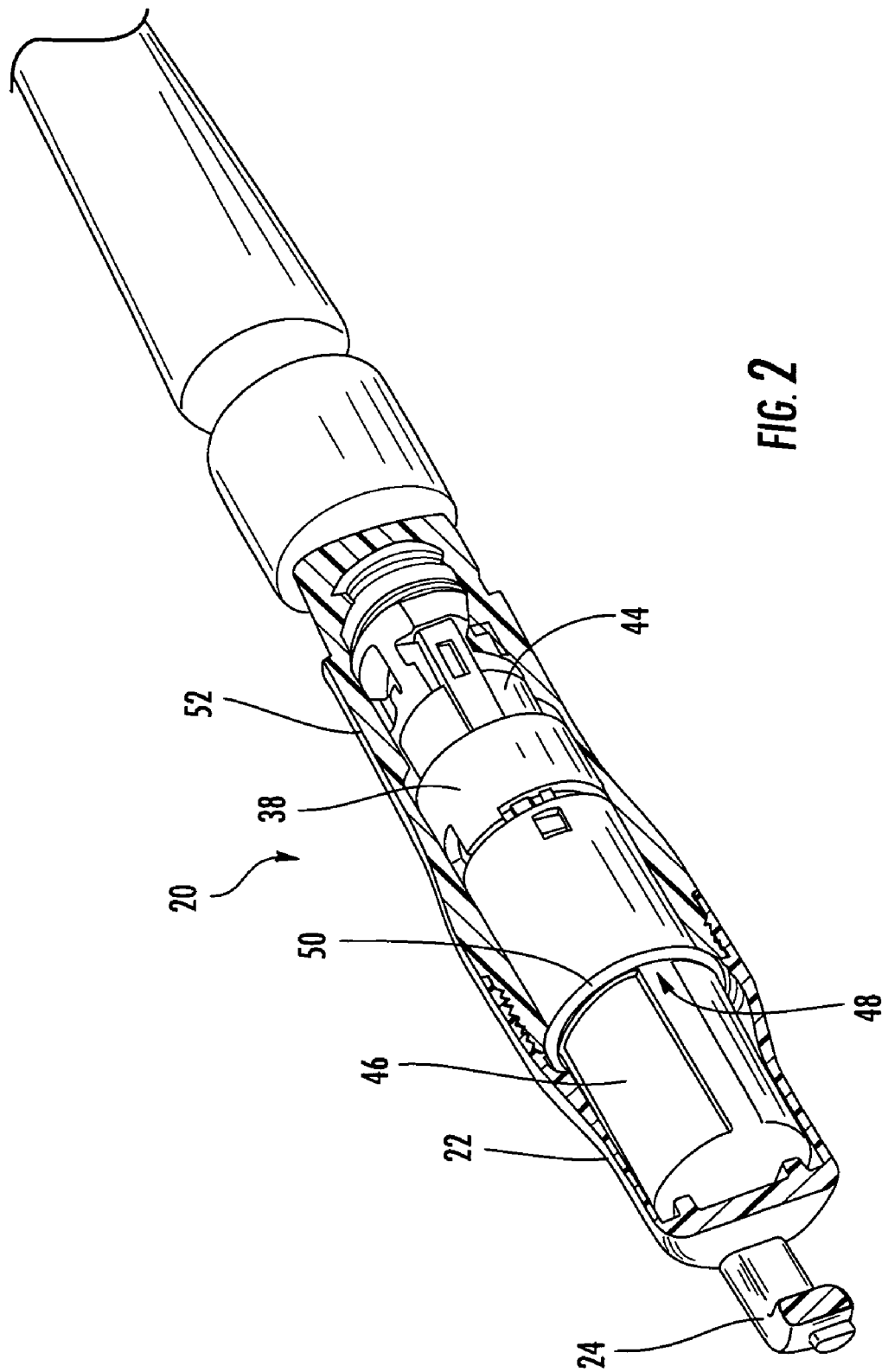
FIG. 2 is a perspective view of the loopback device of FIG. 1 shown with a portion of the dust cap removed for purposes of clarity and an O-ring positioned about the outer sleeve.
Figure 3:
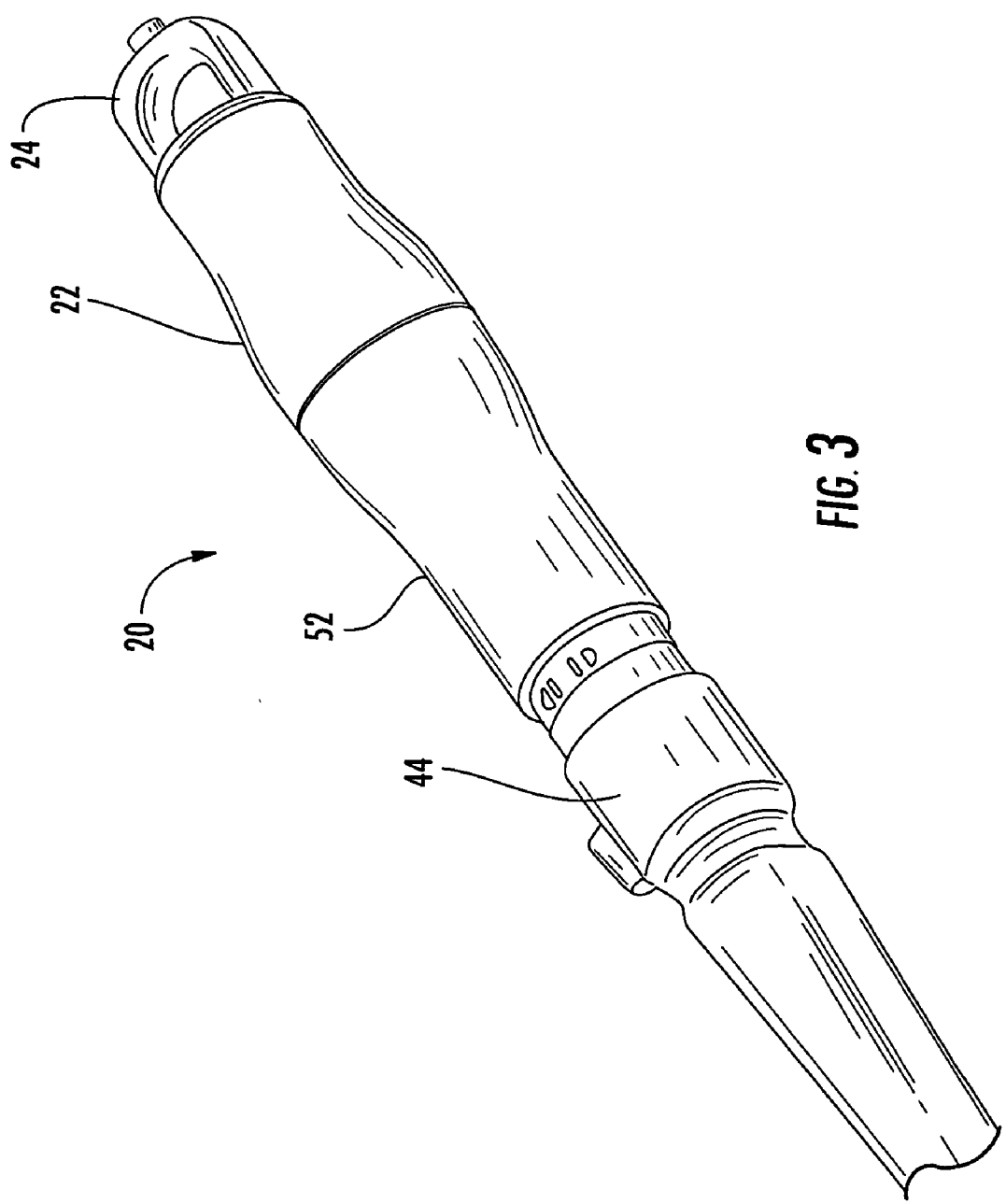
FIG. 3 is a perspective view of the fully assembled loopback device of FIG. 1 shown attached to a plug connector.

Referring to FIG. 2, the inner assembly is shown enclosed within an outer sleeve 46 having orientation geometry and an O-ring channel 48 for seating a sealing O-ring 50. The sealing O-ring 50 on the outer sleeve 46 may mate to the inner lip of a plug-to-plug union body 52. Referring to FIG. 3, the loopback device 20 is shown with the dust cap 22 installed. The dust cap 22 may define an optional pulling grip 24 about one end for pulling the loopback device and distribution cable through a conduit, dust or other installation environment. The configuration of the dust cap may be modified based on the structure of the loopback over which it is installed. The dust cap 22 preferably remains in place during installation and until it is necessary to access the underlying plug connector for connection in the field, such as to provide service to a subscriber. The dust cap 22 may be made from a molded plastic or may be overmolded around the assembled inner components of the loopback device, thereby providing superior sealing performance and durability.

Figure 4:
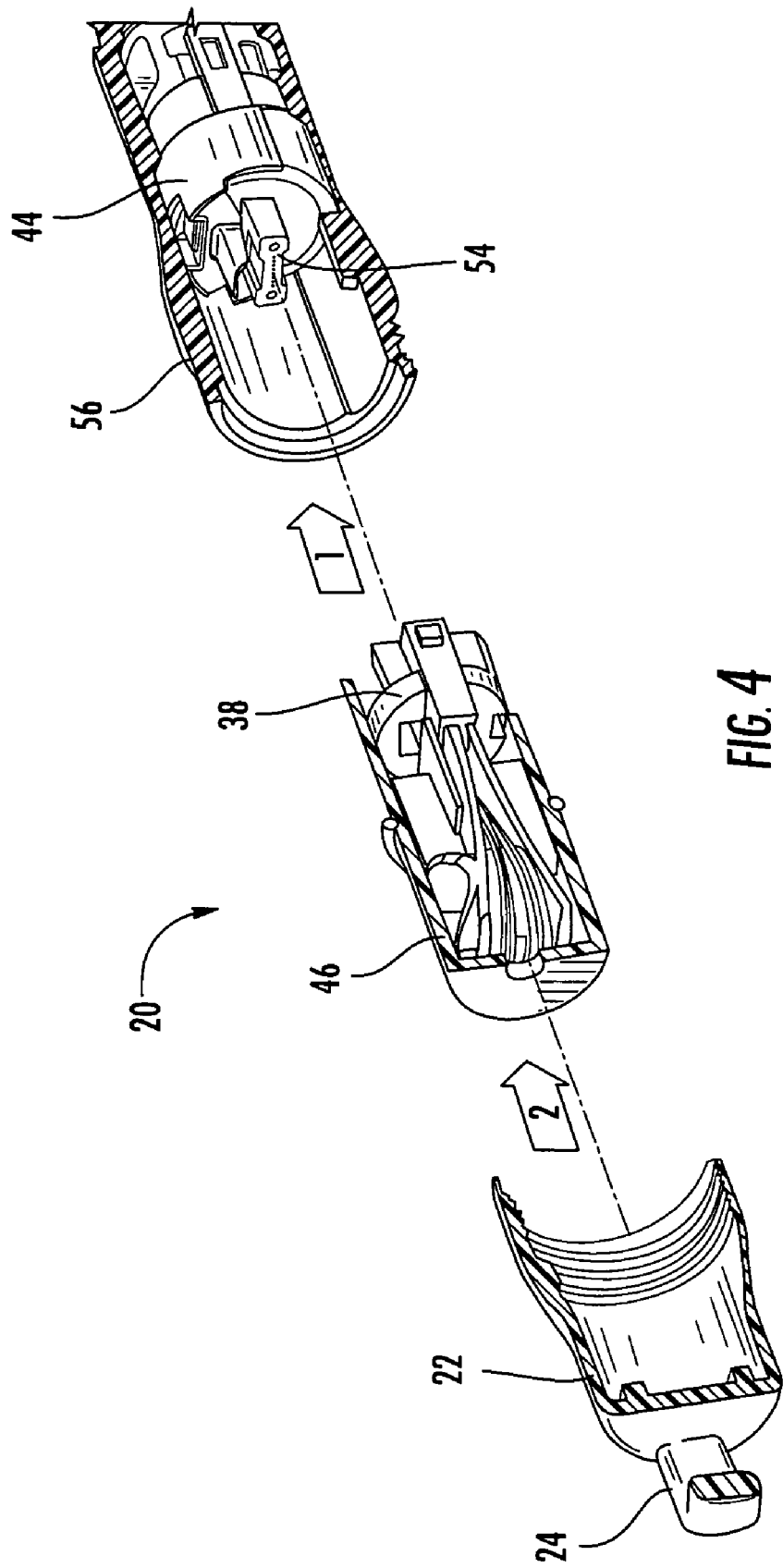
FIG. 4 is an exploded perspective view illustrating the assembly of the loopback device of FIG. 1 with portions removed for purposes of clarity.
Figure 5:
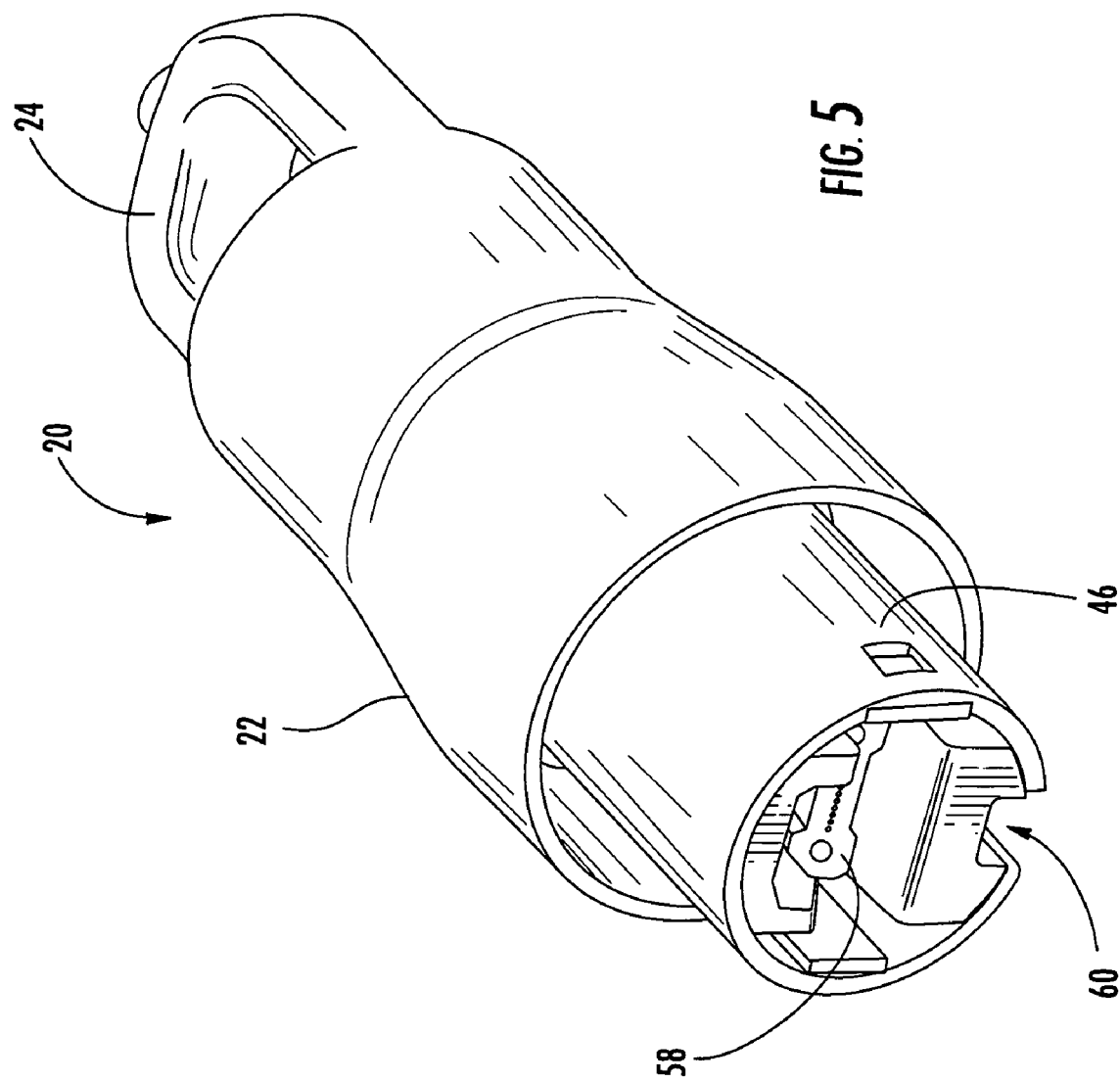
FIG. 5 is an end perspective view of the loopback device of FIG. 1 showing the connective end including a multi-fiber connector.

Referring to FIG. 4, an exploded perspective view illustrating the assembly steps of the loopback device 20 and dust cap 22 are shown. To install the loopback device 20 onto a plug 44 provided, for example, on a distribution cable or tether, the loopback connector (not shown) is mated to the plug connector 54 as the inner assembly disposed within the outer sleeve 46 is received within the plug 44, as indicated by the arrow identifying step 1. After connection in the proper orientation has been achieved, the dust cap 22 is slid over the loopback device 20 and sealingly engages the plug body 56. Referring to FIG. 5, a perspective view of the connective end of the loopback device including the dust cap 22 installed is shown. The multi-fiber ferrule 58 of the device 20 is shown as well as an alignment slot 60 of the outer sleeve 46 operable for aligning the loopback device 20 and the plug 44 in the proper orientation. The alignment slot 60 provides a clearance for receiving a keying feature of the plug. Multi-fiber ferrules require proper ferrule-to-ferrule orientation to ensure that fibers 1-12, for example, are properly matched with fibers 1-12 of the mating ferrule, in the case of a 12-fiber ferrule. The ferrule 58 may include any type of multi-fiber ferrule. One particular connector suitable for use with the present invention is an MT connector available from Corning Cable Systems LLC of Hickory, N.C.

Figure 6:
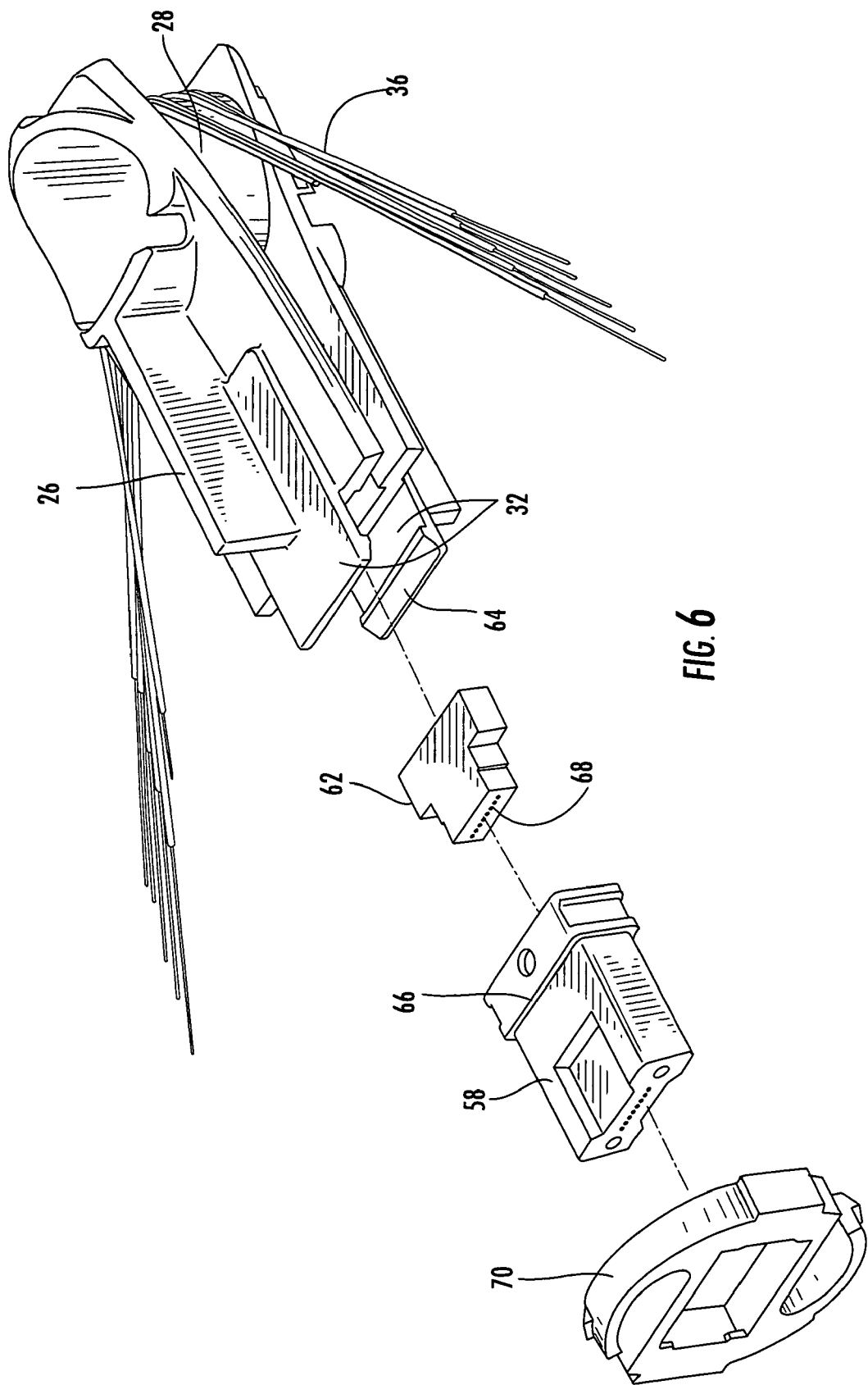
FIG. 6 is an exploded perspective view showing the internal components of the loopback device of FIG. 1.
Figure 7:
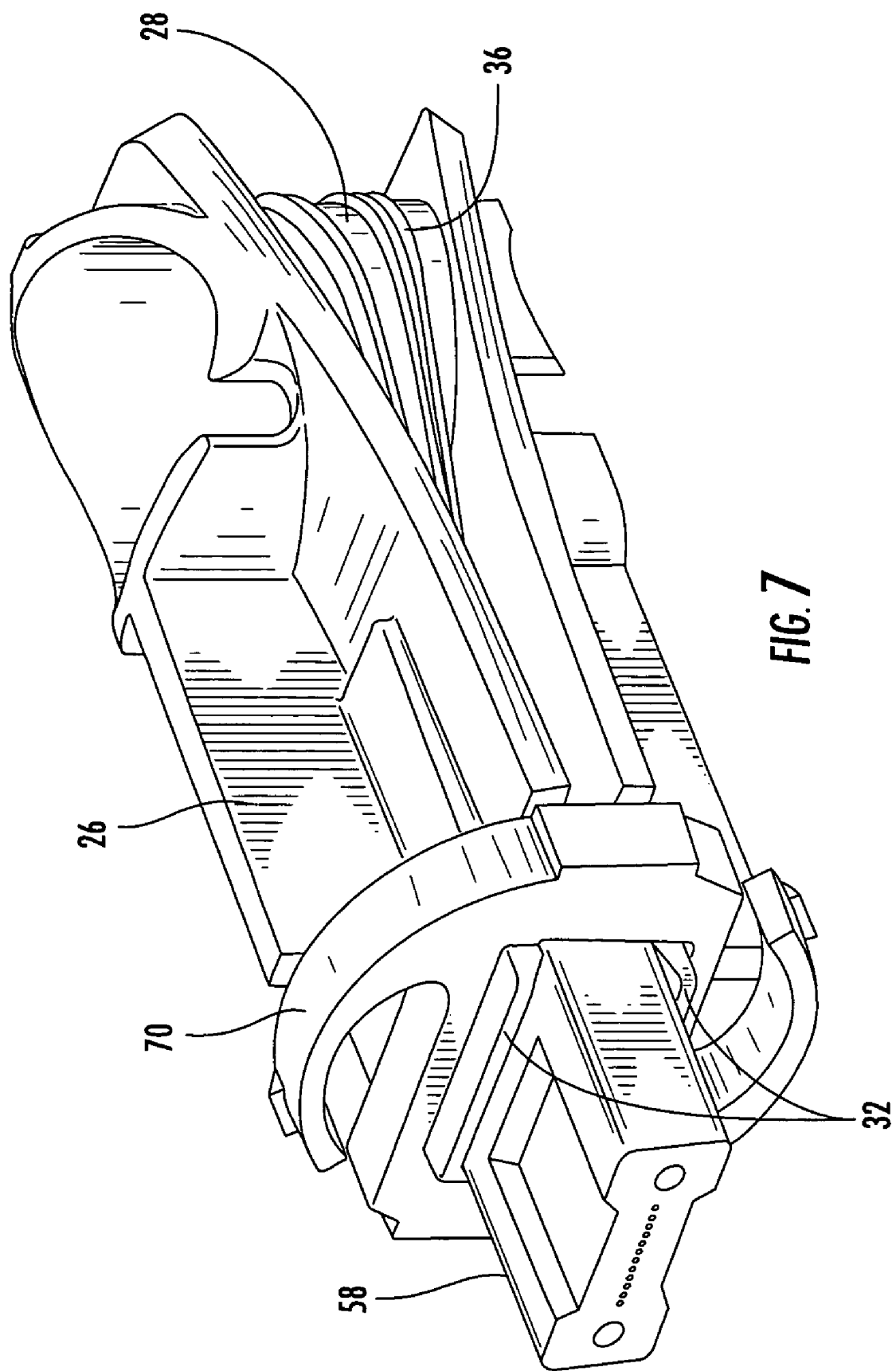
FIG. 7 is a perspective view showing the assembled internal components of the loopback device of FIG. 1.

Referring to FIG. 6, an exploded perspective view of the inner assembly is shown in greater detail. The ferrule retaining features 32 of the loopback body 26 define hooks 64 for receiving and securing a flat 66 defined by the multi-fiber ferrule 58 of the device. The fiber transition ferrule 62 defines a cavity (not shown) on one end for receiving and guiding the coated, or coated and jacketed, ends of the loopback fibers 36 into the transition ferrule 62, and a plurality of fiber bores 68 about the other end for securing the coated portions of the fibers 36. The fiber transition ferrule 62 is received within the non-connective end of the multi-fiber ferrule 58, both of which are then retained in place by the features 32 of the loopback body 26. The ends of the optical fibers 36 are maintained within the multi-fiber ferrule 58 in a known manner, such as by epoxy. The modified sleeve insert 70 is then installed over the multi-fiber ferrule 58 and ferrule retaining features 32 in order to squeeze the features 32 together and apply compressive forces to the ferrule 58, thus retaining the ferrule 58 in place. The sleeve insert 70, as shown in FIG. 5, functions to retain the ferrule 58 and to prevent rotation of the device 20 when attached to the plug 44. The alignment sleeve insert 38 as shown in FIGS. 1-2, 4 may further function to align the loopback ferrule 58 and the plug ferrule. FIG. 7 illustrates the inner assembly components of FIG. 6 in an assembled configuration. Each of the one or more optical fibers 36 is looped around the spool 28 making about a 180 degree turn within the loopback device, and each end of each fiber is mounted within the common multi-fiber ferrule 58. In this regard, a loopback device including a 12-fiber ferrule would require 6 lengths of bend insensitive fibers to fully populate the ferrule, a 24-fiber ferrule would require 12 lengths of bend insensitive fibers to fully populate the ferrule, and so on.

In operation, the loopback device makes it possible to measure signal strength or loss along lengths of optical fiber or lengths of spliced segments of optical fibers without the need for a field technician and/or optical signal detection equipment to be physically present at the downstream ends of the fibers. Further, the use of bend insensitive fibers makes possible a compact loopback device and distribution cable assembly package that is capable of being installed through a conduit or duct having an inner diameter of about 1.25 inches, thus allowing a loopback device to be installed at the end of a tether prior to installation of the distribution cable or tether through a small diameter duct. The one or more short lengths of bend insensitive fibers function to optically connect a first length of optical fiber terminated to a plug multi-fiber ferrule with a second length of optical fiber terminated to the same ferrule, such that a signal transmitted from the upstream end through the first length of optical fiber is then transmitted through the loopback device and back upstream through the second length of optical fiber. In an exemplary application, a 12-fiber plug ferrule is optically connected to a loopback device including a corresponding 12-fiber ferrule and 6 bend insensitive fibers looped within for optically connecting the number 1 fiber to the number 12, for example, thus making fibers 1 and 12 continuous in order to measure signal strength or loss through the number 1 and number 12 fibers from the upstream end without having to be present at the downstream end. The loopback device thus provides a "loop" of fibers for sending an optical signal transmitted downstream through an extended length of an optical fiber back upstream through the same or another optical fiber.

The loopback device enables a service provider with the ability to measure signal strength or loss in a length of optical fibers, or a length of optical fiber segments, at the upstream end of the fiber. The loopback device may be designed to accommodate 2f, 4f, 6f, 8f, 12f, 24f, 32f, 48f and 72-f multi-fiber ferrules, among others. The loopback device of the present invention avoids the high losses associated with conventional SMF 28-type fiber. The loopback device is preferably capable of maintaining bend related losses below about 0.5 dB at about 1300 nm for about a 12.0 mm bend through about 180 degrees. The distribution cable, tether (if present) and the loopback device with the protective dust cap installed preferably has a diameter less than about 1.25 inches at its widest point.

In an exemplary method of use, the loopback device of the present invention may be used to measure signal strength or loss in optical fibers of a 12-fiber tether cable of a pre-engineered fiber optic distribution cable from the upstream end. For example, fibers 1-12 originate at a central office and are spliced or otherwise optically connected to additional fiber lengths at a tap point. The extended lengths of optical fibers 1-12 terminate at a downstream location in a 12-fiber multi-fiber ferrule. A loopback device according to the invention is attached at the downstream end of the tether and includes a corresponding multi-fiber ferrule and 6 bend insensitive fibers, namely BIF-1, BIF-2, BIF-3, etc. One end of BIF-1 may be mounted within the corresponding ferrule in fiber position 1, looped around the spool, and the other end of BIF-1 mounted in fiber position 12. One end of BIF-2 may be mounted within the corresponding ferrule in fiber position 2, looped around the spool, and the other end of BIF-2 mounted in fiber position 11. One end of BIF-3 may be mounted within the corresponding ferrule in fiber position 3, looped around the spool, and the other end of BIF-3 mounted in fiber position 10, and so forth. Thus, the loopback device makes tether fibers 1 and 12 continuous, 2 and 11 continuous, 3 and 10 continuous, and so forth. An optical signal transmitted along fiber 1 from an upstream location passes through the loopback device and back upstream along fiber 12. Accordingly, fiber transpositions may also be identified using the loopback device of the present invention.

Figure 8A:
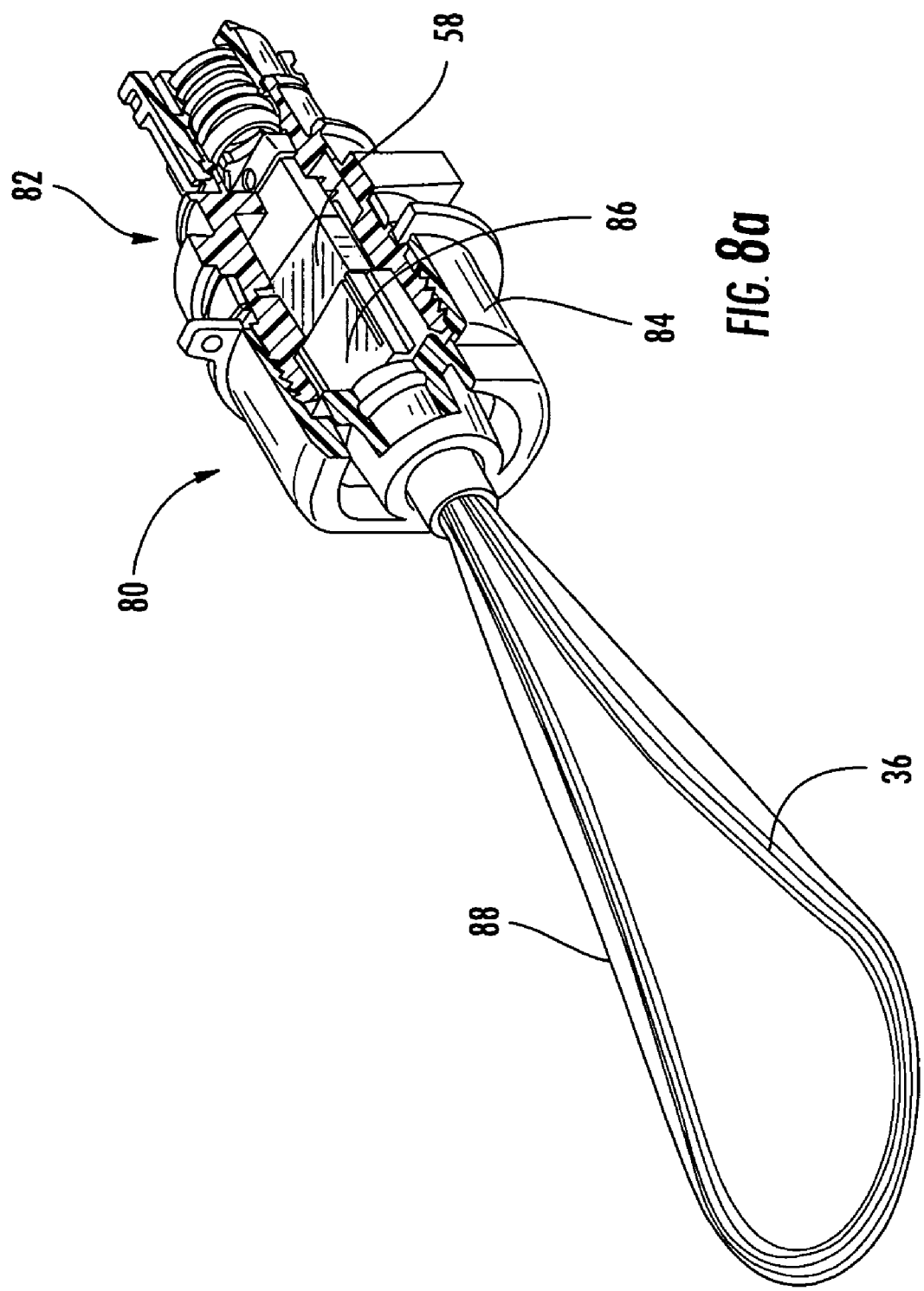
FIG. 8a is a perspective view of an alternative embodiment of a loopback device according to the invention shown attached to a plug connector and with portions removed for purposes of clarity.
Figure 8B:
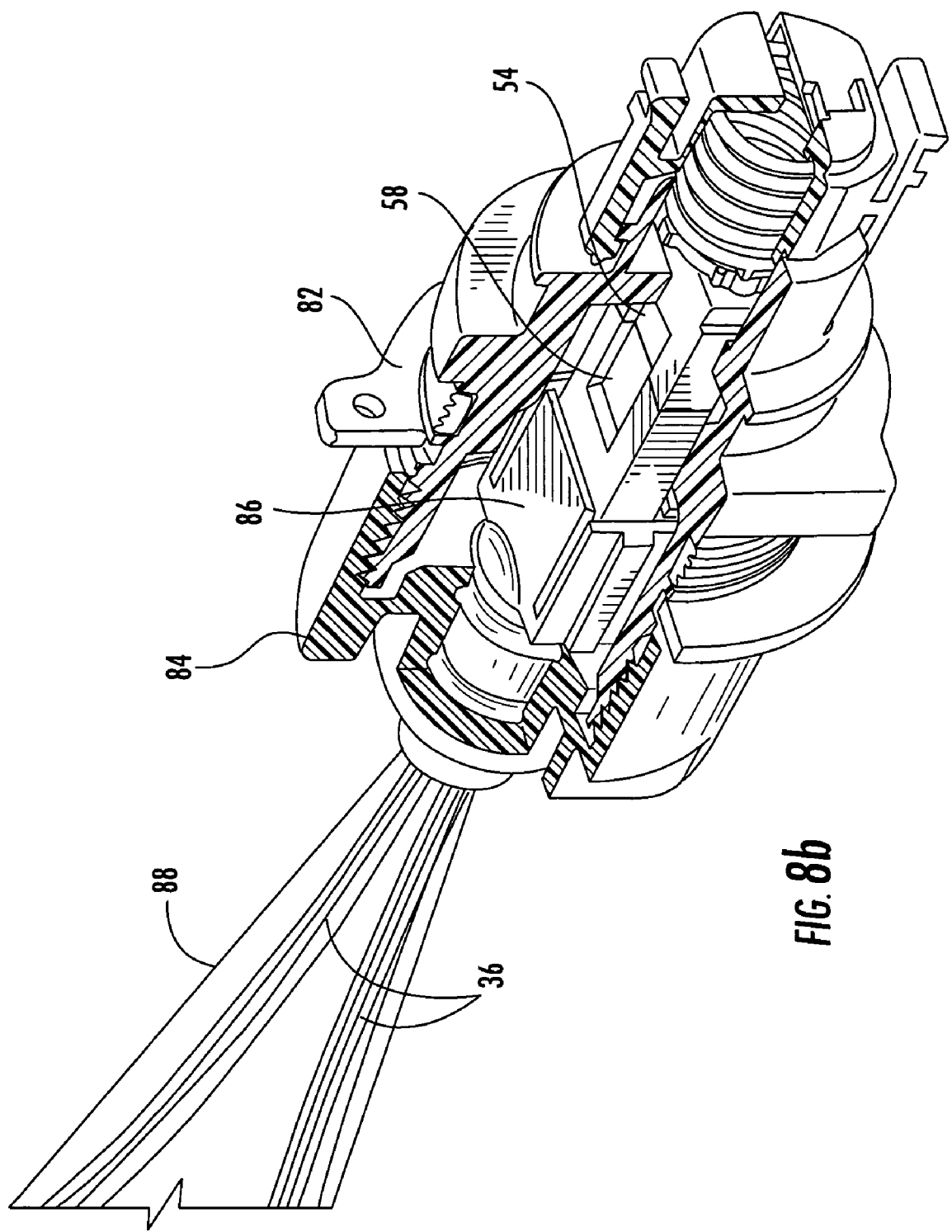
FIG. 8b is a perspective view of the loopback device of FIG. 8a illustrating the plug end with portions removed for purposes of clarity.

Referring to FIGS. 8a-b, an alternative embodiment of a loopback device 80 utilizing bend insensitive fiber is shown attached to a portion of a plug 82 including a spring loaded multi-fiber ferrule. The loopback device 80 includes a coupling nut 84 for receiving and securing the externally threaded plug 82 to the loopback device. The loopback device 80 further includes a ferrule holder 86 for securing and orienting the loopback multi-fiber ferrule 58 within the device. A loop of bend insensitive fibers 36 are mounted within the device ferrule 58 as previously been described above and are looped within a protective enclosure 88 such that the reduced minimum bend radius of the fibers is not violated. The protective enclosure 88 is preferably made from a rigid, crush-resistant material sufficient for maintaining the loop of fibers 36. The enclosure 88 sealingly engages the ferrule holder 86 and may also sealingly engage the coupling nut 84.

Figure 9:
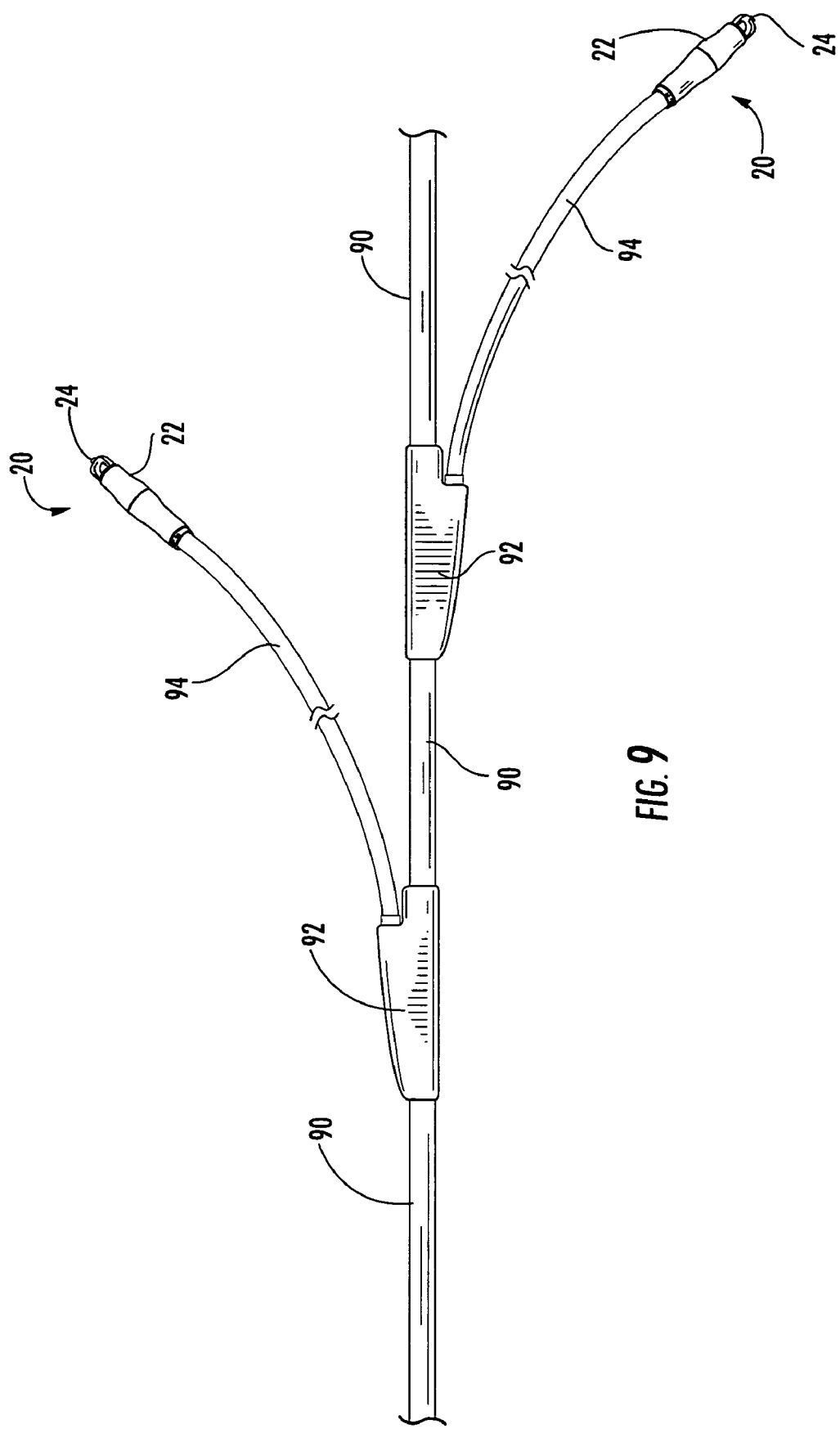
FIG. 9 is a schematic diagram illustrating a connectorized distribution cable assembly with loopback devices according to the invention attached to the connectorized ends of the tethers.

Referring to FIG. 9, an exemplary distribution cable 90 of an FTTx network is shown. The distribution cable 90 includes a plurality of mid-span access locations 92 (also referred to herein as "tap points" or "taps") at which one or more optical fibers of the distribution cable 90 are severed, routed away from the remaining optical fibers of the distribution cable 90, and are spliced or otherwise optically connected to optical fibers of a tether 94. Each tether 94 terminates in a connector plug including a multi-fiber ferrule presented for future connection with an ONT, NID or other optical connection terminal as needed, for example to extend service to a new subscriber. A loopback device 20 utilizing bend insensitive fiber as described herein is connected at the end of each tether 94. Each loopback device 20 is shown enclosed within a protective dust cap 22 defining an optional pulling grip 24. The loopback device 20 remains connected to the plug during installation of the distribution cable 90 and tether 94, if present, until connection to the plug is desired. The loopback device 20 provides a means for transmitting an optical signal downstream along a pre-selected optical fiber through the loopback device 20 and back upstream along another pre-selected optical fiber. The loopback devices 20 are preferably installed on the distribution cable or tether in the factory in order to protect the connector plugs prior to and during installation. The tethers 94 and loopback devices 20 may be lashed to the distribution cable 90 to facilitate cable reeling and initial installation over aerial pulleys or through conduit. Tethers 94 are unlashed and routed away from the distribution cable 90 to an optical connection terminal as needed. The pulling grip 24 may be used to pull the tether 94 to the optical connection terminal. The loopback device 20 is used to test for signal strength or loss in the length of optical fibers subsequent to installation to verify that the cable was installed without damaging the optical fibers. As a check, before connecting a connector plug into service, the length of optical fiber is tested using the loopback device to save field labor costs and the time required to deploy a field technician and/or detecting equipment to the location of the connector plug.

In addition to damage that may occur during installation, it is vital in making a low loss multi-fiber ferrule connection that the fiber array geometry be precise. Holding the fiber end faces in a common plane over time and repeated mating is important in achieving and maintaining physical contact. The use of the loopback devices of the present invention results in the loopback ferrule and the connector plug ferrule being mated for long periods of time prior to the plug connector actually being placed into service. Because unmated ferrules tend to suffer much lower rates of fiber array degradation, the spring load in the loopback device of the present invention should be reduced to a level well below industry standards. Ferrule spring force values between about 0.25 psi and about 0.7 psi are preferred, while spring force values of about 0.5 psi to about 0.7 psi are even more preferred in order to prevent array uniformity degradation while still providing for acceptable mating over a wide temperature range. Alternative methods for maintaining array uniformity over time may include stronger bonding of the optical fibers within the plug ferrule, setting an air gap between the mating fibers of the plug ferrule and the loopback device ferrule, and using a weaker epoxy in the loopback device ferrule so that the fiber bonding in the loopback ferrule fails before the fiber bonding in the plug ferrule.

Figure 10C:
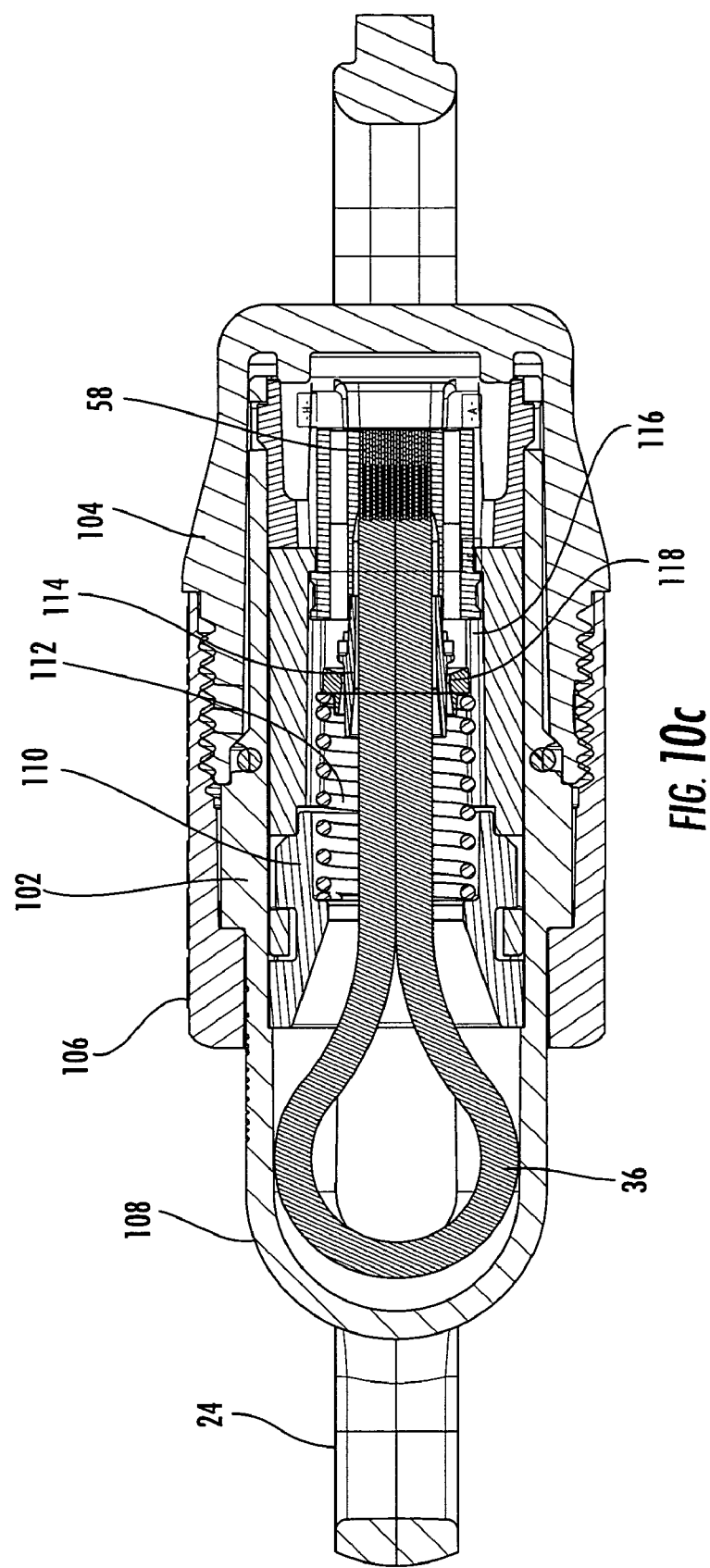
FIG. 10c is a lengthwise cross-sectional view of the loopback device of FIG. 10b.

Referring to FIGS. 10a-c, another embodiment of a loopback device according to the invention is shown. FIG. 10a shows an exploded perspective view, FIG. 10b shows a fully assembled view of the loopback, and FIG. 10c is a cross-sectional view of the loopback of FIG. 10b. The loopback includes a loopback sub assembly 100 utilizing bend insensitive fiber 36. The loopback further includes a loopback outer housing 102 and an alignment sleeve insert 38. Prior to installation on a connectorized distribution cable assembly, the loopback device ferrule 58 may be protected using a removable dust cap 104 that sealingly engages the outer housing 102 using an O-ring 50. The loopback device is secured to, for example, a connectorized tether by an internally threaded coupling nut 106 that engages an externally threaded connector plug (not shown). Prior to installation, the coupling nut 106 may instead engage the removable dust cap 104. The bend insensitive fibers 36 are protected from damage by end 108 of the loopback outer housing 102. Loopback outer housing end 108 may define an optional pulling grip 24. Referring specifically to FIG. 10c and shown in greater detail in FIGS. 11a-11b, the loopback device further includes a loopback spring push 110, a spring 112, a ferrule boot 114, a plug inner housing 116 and a spring centering cuff 118.

Referring to FIGS. 11a-b, the loopback subassembly is shown in exploded and fully assembled configurations, respectively. The subassembly includes the loopback spring push 110 for seating the main spring 112. The spring centering cuff 118 and ferrule boot 114 provide for spring force centering as is needed with multi-fiber ferrules to ensure proper ferrule-to-ferrule mating. One end of the ferrule boot 114 is received within the loopback ferrule 58, while the other end seats the spring centering cuff 118. The plug inner housing 116 connects to the loopback spring push 110, thus maintaining the ferrule 58 and spring force components therebetween. As stated above, fiber array degradation in the plug ferrule over time may be avoided by using a reduced spring force in the loopback as compared to that of the plug ferrule of the distribution cable assembly.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A loopback device utilizing bend insensitive optical fiber, comprising:
   one or more bend insensitive optical fibers;
   a loopback multi-fiber ferrule for receiving end portions of the one or more bend insensitive optical fibers;
   an alignment sleeve insert positioned about the loopback multi-fiber ferrule operable for loopback alignment;
   a loopback inner assembly for receiving the loopback multi-fiber ferrule;
   a dust cap for sealingly engaging with a connector plug having a corresponding multi-fiber ferrule;
   wherein the loopback device is operable to transmit an optical signal from an upstream location along at least one optical fiber through the loopback device and back to the upstream location along at least one optical fiber.

2. The loopback device according to claim 1, wherein the loopback is sized for installation with a distribution cable assembly through a conduit having an inner diameter of less than about 1.25 inches.

3. The loopback device according to claim 1, wherein the inner assembly includes a spool defining a radius for routing the one or more bend insensitive optical fibers from the loopback multi-fiber ferrule.

4. The loopback device according to claim 1, further comprising an outer sleeve partially encapsulating the inner assembly.

5. The loopback device according to claim 1, wherein the one or more bend insensitive optical fibers are capable of maintaining bend related losses below about 0.5 dB at about 1300 nm for about a 12.0 mm bend through about 180 degrees.

6. The loopback device according to claim 1, wherein the loopback device is optically connected to a connectorized fiber optic distribution cable assembly.

7. The loopback device according to claim 1, further comprising a spring for exerting a spring force on the loopback multi-fiber ferrule in the direction of the corresponding multi-fiber ferrule.

8. The loopback device according to claim 7, wherein the spring force exerted on the loopback multi-fiber ferrule is less than a spring force exerted on the corresponding multi-fiber ferrule.

* * * * *